(12) United States Patent
Fielder

(10) Patent No.: US 11,919,074 B2
(45) Date of Patent: Mar. 5, 2024

(54) ADDITIVE MANUFACTURING USING THERMAL INKJET PRINTHEADS

(71) Applicant: Memjet Technology Limited, Dublin (IE)

(72) Inventor: Simon Fielder, North Ryde (AU)

(73) Assignee: Memjet Technology Limited, Dublin (IE)

( * ) Notice: Subject to any disclaimer, the term of this patent is extended or adjusted under 35 U.S.C. 154(b) by 0 days.

(21) Appl. No.: 17/713,568

(22) Filed: Apr. 5, 2022

(65) Prior Publication Data
US 2022/0331866 A1 Oct. 20, 2022

Related U.S. Application Data

(60) Provisional application No. 63/176,059, filed on Apr. 16, 2021.

(51) Int. Cl.
| | |
|---|---|
| *B22F 10/14* | (2021.01) |
| *B22F 1/145* | (2022.01) |
| *B22F 12/40* | (2021.01) |
| *B22F 12/50* | (2021.01) |
| *B33Y 10/00* | (2015.01) |
| *B33Y 30/00* | (2015.01) |
| *B33Y 70/00* | (2020.01) |

(52) U.S. Cl.
CPC ............. *B22F 10/14* (2021.01); *B22F 1/145* (2022.01); *B22F 12/40* (2021.01); *B22F 12/50* (2021.01); *B22F 2998/10* (2013.01); *B22F 2999/00* (2013.01); *B33Y 10/00* (2014.12); *B33Y 30/00* (2014.12); *B33Y 70/00* (2014.12)

(58) Field of Classification Search
CPC ......... B22F 10/14; B33Y 10/00; B33Y 70/00; B33Y 70/10; C09D 11/30; C09F 11/24
See application file for complete search history.

(56) References Cited

U.S. PATENT DOCUMENTS

| | | | |
|---|---|---|---|
| 2008/0278527 A1* | 11/2008 | Newell ................. | B41J 2/2139 347/12 |
| 2012/0162337 A1* | 6/2012 | Oberski ............... | B41M 7/0081 347/102 |
| 2016/0108259 A1* | 4/2016 | Hirata .................. | B33Y 70/10 524/786 |
| 2017/0297111 A1* | 10/2017 | Myerberg ............. | B28B 1/001 |
| 2020/0032071 A1* | 1/2020 | Champagne, Jr. ...... | B05D 1/12 |

* cited by examiner

*Primary Examiner* — Ricardo D Morales
(74) *Attorney, Agent, or Firm* — Cooley LLP

(57) ABSTRACT

An additive manufacturing method using an inkjet printhead supplied with a binder fluid, said method comprising the steps of: (a) providing a layer of powdered build material including a monomer; (b) selectively jetting the binder fluid onto predetermined regions of the layer of powdered build material, the binder fluid comprising a catalyst; (c) optionally exposing the layer of powdered build material to an energy source to initiate polymerization of the monomer; and (d) optionally repeating steps (a) to (c).

17 Claims, 2 Drawing Sheets

ADDITIVE MANUFACTURING USING THERMAL INKJET PRINTHEADS

CROSS REFERENCE TO RELATED APPLICATIONS

This application claims priority to and the benefit of U.S. Provisional Patent Application No. 63/176,059, filed on Apr. 16, 2021, the disclosure of which is incorporated herein by reference in its entirety for all purposes.

FIELD OF THE INVENTION

This invention relates to an additive manufacturing method, known in the art as 3D printing. It has been developed primarily for facilitating 3D printing using thermal inkjet printheads.

BACKGROUND OF THE INVENTION

The present Applicant has developed a plethora of pagewide thermal inkjet printheads suitable for use in high-speed inkjet printers. Such printheads have been commercialized for use in many high-speed 2D printing systems, as described in, for example, US2017/0313061 and WO2020/069845, the contents of which are incorporated herein by reference.

Aside from conventional 2D printing, pagewide inkjet printhead technology also has enormous potential to increase manufacturing speeds in the field of additive manufacturing ("3D printing"). In a typical system for additive manufacturing, a binder fluid is jetted from an inkjet printhead to bind particles of a powder bed in predetermined regions. The binder fluid is jetted onto successive layers of powder to form a three-dimensional "green part". Unbound powder is then removed from the green part and, in the case of, for example, metal powders, the green part is sintered in a furnace to produce a three-dimensional metal object. Usually, the unbound powder that is removed from the green part is recycled for subsequent use.

As described in the prior art, the binder fluid contains a polymer to bind particles in the powder bed together. The polymer may be, for example, an acrylic polymer which provides sufficient binding strength to form the green part. The prior art focuses on polymers that increase the binding strength of the green part whilst providing sufficiently clean metal products after sintering. For example, highly cross-linked polymers provide increased binding strength but are prone to leaving behind carbon deposits when pyrolyzed.

MEMS thermal inkjet technology is available at significantly lower costs than piezo inkjet technologies. On the other hand, piezo inkjet technology enables a wider range of jettable fluids than thermal inkjet technology. In particular, thermal inkjet technology is usually limited to aqueous-based fluids. Moreover, thermal inkjet devices are susceptible to failure via kogative and/or corrosive mechanisms. Kogation is a term describing the buildup of deposits on thermal inkjet heater elements. Such deposits result in lower droplet volumes (via less efficient energy transfer to the jettable fluid), ultimately resulting in non-ejection and shortened printhead lifetimes.

Polymers, especially high molecular weight polymers, are a known source of kogation in thermal inkjet devices. Inkjet heater elements are particularly susceptible to kogation from acrylic polymer additives as well as styrene-acrylic polymers, which are used for dispersion of pigments in some conventional 2D inks.

For thermal inkjet printheads, the jettable fluid should ideally be relatively benign towards the inkjet device—being neither corrosive nor kogative towards the heater elements. However, binder fluids used in prior art 3D printing systems generally contain polymers which significantly decrease the lifetime of thermal inkjet printheads. The problem of kogation is exacerbated further by the relatively high concentrations of polymers required in binder fluids for 3D printing. Furthermore, with high concentrations of high molecular weight polymers, inkjet fluids simply become unjettable.

It would therefore be desirable to provide a 3D printing system and method, which is compatible with thermal inkjet printheads, whilst still enabling formation of green parts with sufficient bonding strength. In particular, it would be desirable to provide a 3D printing method, which utilizes a binder fluid containing minimal amounts of kogative ingredients.

SUMMARY OF THE INVENTION

In a first aspect, there is provided an additive manufacturing method using an inkjet printhead supplied with a binder fluid, said method comprising the steps of:
  (a) providing a layer of powdered build material including a monomer;
  (b) selectively jetting the binder fluid onto one or more first predetermined regions of the layer of powdered build material, the binder fluid comprising a catalyst;
  (c) optionally exposing the layer of powdered build material to an energy source to initiate polymerization of the monomer; and
  (d) optionally repeating steps (a) to (c).

The method according to the first aspect advantageously obviates kogative species in the binder fluid and is therefore highly suitable for use with thermal inkjet printheads.

Preferably, the inkjet printhead is a pagewide thermal inkjet printhead.

Preferably, the binder fluid is absent any polymers having a molecular weight of 5,000 g/mol or more.

Preferably, the binder fluid is absent any acrylic polymers or acrylic copolymers.

Preferably, the binder fluid is absent any polymers

Preferably, the catalyst is soluble in the binder fluid.

Preferably, the catalyst is present in the binder fluid in an amount of 5 wt. % or less.

In some embodiments, the method includes the step of non-selectively depositing a primer fluid comprising the monomer onto the layer of powdered build material. In other embodiments, the build material is pre-treated or pre-coated with the monomer.

Preferably, build material is a metallic powder.

In some embodiment, the method further comprises the step of:
  selectively depositing an inhibitor fluid onto one or more second predetermined regions of the layer of powdered build material.

Preferably, the second predetermined regions are different than the first predetermined regions.

Typically, the inhibitor fluid is jetted from a same inkjet printhead as the binder fluid.

Preferably, the method further comprises at least one of:
  a curing step;
  a step of removing the build material from regions outside the first predetermined regions; and
  a sintering step.

Preferably, the catalyst has a molecular weight of 1000 g/mol or less.

Preferably, the binder fluid is aqueous-based and the catalyst is selected from the group consisting of: diaryliodonium salts and azobis(cyanoalkanoic acid).

Preferably, the monomer is selected from the group consisting of: epoxides, glycidyl ethers, lactones, paraformaldehyde, vinyl ethers, oxetanes and acrylates.

In a second aspect, there is provided an additive manufacturing assembly comprising:
- a supply bed for supplying a powdered build material;
- a fabrication bed for building a green part;
- a dispenser for dispensing a layer of build material onto an upper surface of the green part;
- a thermal inkjet printhead for selectively jetting a binder fluid onto the layer of build material in one or more first predetermined regions; and
- a binder fluid reservoir for supplying the binder fluid to the inkjet printhead, said binder fluid comprising a catalyst, wherein the catalyst catalyses polymerization of a monomer dispersed in the layer of build material, thereby binding the build material in the first predetermined regions.

In some embodiments, the additive manufacturing assembly further comprises:
- an applicator for applying a primer fluid to the build material; and
- a primer fluid reservoir for supplying the primer fluid to the applicator, said primer fluid comprising the monomer.

In other embodiments, the build material in the supply bed is pre-treated with the monomer.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1A:
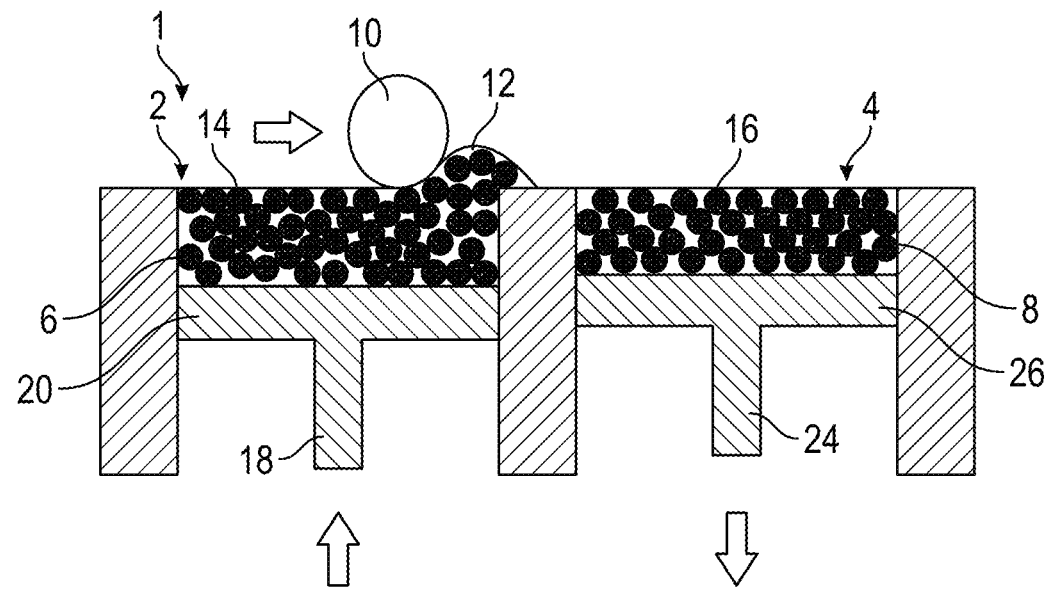
FIG. 1A is a schematic side view of an additive manufacturing assembly dispensing build material onto a fabrication bed.
Figure 1B:
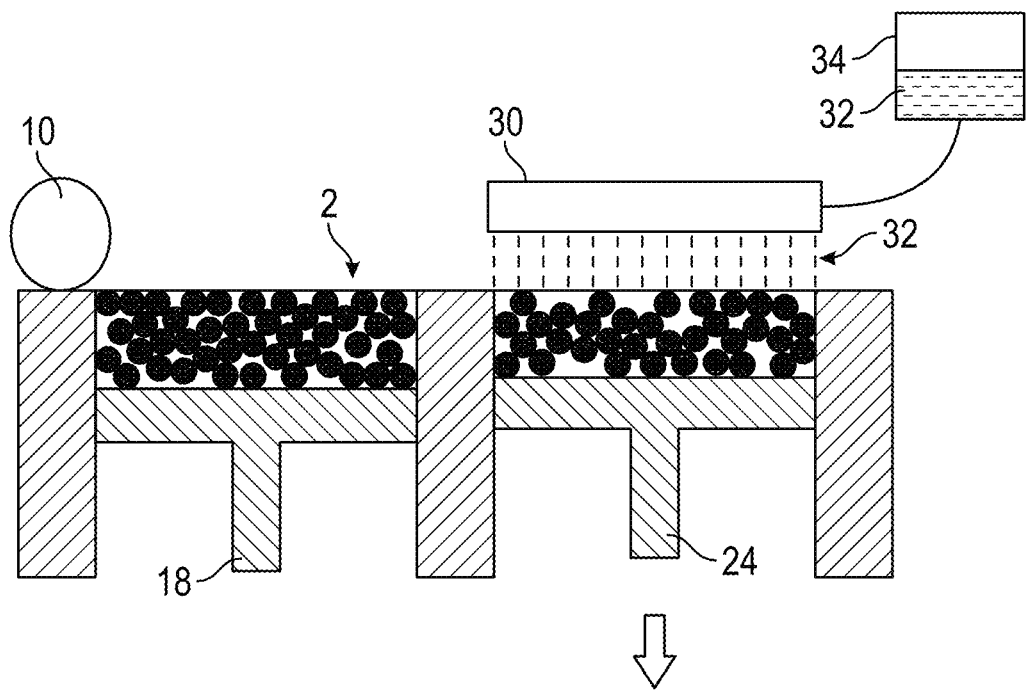
FIG. 1B is a schematic side view of a primer fluid being deposited onto a layer of build material.
Figure 1C:
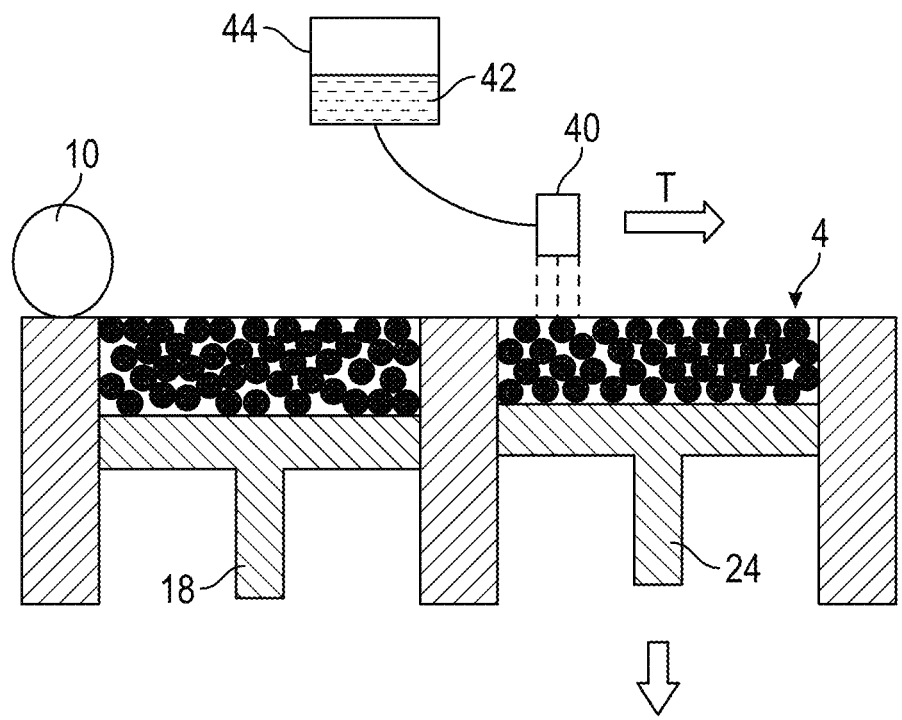
FIG. 1C is a schematic side view of a binder fluid being deposited using an inkjet printhead.

FIG. 1A-1C show schematically a cycle of steps in a method of additive manufacturing according to one embodiment of the present invention. The cycle begins partway through formation of a green part, although it will be appreciated by those skilled in the art that the cycle is repeated to build up successive layers until the final green part is fully formed.

FIG. 1A shows an additive manufacturing assembly 1 comprising a supply bed 2 and a fabrication bed 4. The supply bed 2 contains a reservoir of powdered build material 6, which is used as a base material for forming a 3D object. The build material 6 may be any suitable material for additive manufacturing, such as metals (e.g. stainless steel) or polymers (e.g. polyamides, polyethylenes, polystyrenes, polypropylenes, polyesters, polystyrenes etc). Typically, the supply bed contains a metallic powder.

The fabrication bed 4 adjacent the supply bed 2 contains a partially-fabricated green part 8 built up from successive layers of powder bonded together in predetermined regions. As shown in FIG. 1A, in order to fabricate a new layer of the green part, a dispenser in the form of roller 10 is used to spread a slug 12 of the powdered build material 6 from a supply surface 14 of the supply bed 2 onto an upper surface 16 of the fabrication bed 4. To this end, a supply piston 18 is operatively connected to a movable base 20 of the supply bed 2 in order to move the supply bed upwards after a new slug 12 of powdered material has been removed therefrom by the roller 10. Likewise, a fabrication piston 24 is operatively connected to a movable base 26 of the fabrication bed 4 in order to move the fabrication bed downwards after the slug 12 of powdered material has been spread across the upper surface 16 of the partially-formed green part 8.

In some embodiments, the build material 6 supplied from the supply bed 2 is pre-treated with a monomer. For example, a metallic powder may be dispersed in a solvent containing the monomer and the solvent removed to provide the metallic powder coated with the monomer. The coated powder is loaded into the supply bed 2 for use in the additive manufacturing process.

In an alternative embodiment, and referring to FIG. 1B, once an untreated build material 6 has been evenly spread across the upper surface 16 of the partially-formed green part 8, an applicator 30 is used to deposit a primer fluid 32 onto the fresh layer of powdered material 6. The applicator 30 may be for example, a spray applicator supplied from a primer reservoir 34 containing the primer fluid 32. The applicator 30 typically sprays the primer fluid 32 non-selectively over the upper surface 16 of the partially-formed green part 8. Alternatively, the applicator 30 may be an inkjet printhead, such as a piezo printhead. In some embodiments (not shown), the applicator may be a roller for applying the primer fluid 32 via a roller action. The roller may be the same or different than the roller used to spread the powdered material from the supply bed onto the fabrication bed.

The primer fluid 32 supplied to the applicator 30 comprises a monomer, which primes the powdered material 6 for a subsequent polymerization and bonding step. The primer fluid 32 may, for example, contain neat monomer or the primer fluid may comprise the monomer dispersed or dissolved in a suitable solvent. The type of monomer is not particularly limited and may be any monomer suitable for providing sufficient bonding strength for the green part upon polymerization. Examples of suitable monomers are: epoxides (including glycidyl ethers, aliphatic epoxides etc.), lactones, paraformaldehyde, vinyl ethers, oxetanes, polyamines, polyaldehydes, bis-maleimides, acrylates, alkenes (including cycloalkenes, styrenes etc.), silanes etc. Exemplary primer fluid formulations are described in detail below.

Referring to FIG. 1C, with the build material spread onto the partially-formed green part 8 and treated with a suitable a monomer (either via a pre-treatment step or via application of the primer fluid 32), an inkjet printhead 40 is used to selectively jet a binder fluid 42 onto the build material 6 in one or more predetermined regions. The printhead 40 is typically a thermal inkjet printhead, such as a Memjet® pagewide inkjet printhead, supplied with binder fluid from a binder reservoir 44 containing the binder fluid 42. Suitable pagewide printheads are described hereinbelow. As shown in FIG. 1C, the pagewide printhead 40 is viewed end-on and traverses over the fabrication bed 4 in the direction indicated by arrow T.

The binder fluid 42 comprises a jettable inkjet vehicle containing a catalyst in sufficient quantity to catalyze polymerization of the monomer. Once polymerized, the build material 6 is bound together in the predetermined regions and a layer of the green part is formed. Polymerization may occur spontaneously on contact between the binder fluid 42 and the primed build powder. Typically, polymerization is initiated on exposure to an energy source (e.g. heat, IR radiation or UV light) in a subsequent step.

Typically, the binder fluid 42 is aqueous-based and the jettable inkjet vehicle corresponds to a conventional inkjet vehicle used in dye-based and pigment-based inks. Accordingly, the aqueous inkjet vehicle typically contains one or more co-solvents (e.g. humectants) and surfactants, such as those conventionally used in inkjet inks in order to meet, for example, viscosity, surface tension and dehydration requirements of the inkjet printhead. Other additives, such as those described in for example US2020/0016900, U.S. Pat. Nos. 9,546,292 and 9,422,441 (the contents of each of which are incorporated herein by reference) may be included in the jettable inkjet vehicle in order to improve printhead lifetime. Optional ingredients for the inkjet vehicle are described in detail hereinbelow.

The catalyst contained in the binder fluid 42 is not particularly limited, but is preferably selected so as to be relatively benign towards thermal inkjet devices. Typically, the catalyst is dispersible or soluble in the jettable inkjet vehicle and has a relatively low molecular weight (e.g. less than 1000 g/mol) in order to minimize kogation and maximize the lifetime of the printhead. Examples of suitable catalysts are: diaryliodonium salts, triarylthionium salts, 4-4'-azo-bis-4-cyanopentanoic acid and 2,2'-azobis(2-methylpropionamidine) dihydrochloride. Other types of catalysts include: metal salts, peroxides, persulfates, platinic acids etc. Solvent soluble catalysts are also within the ambit of the present invention and may include, for example, metallocenes, transition metal carbene catalysts ("Grubbs catalysts") etc. Typically, the catalyst is present in the binder fluid in an amount of less than 10 wt. %, less than 5 wt. % or less than 1 wt. %.

Optionally, the inkjet printhead 40 may be used to selectively jet an inhibitor fluid onto the build material 6 in one or more predetermined regions, which are different than the predetermined regions receiving the binder fluid. The inhibitor fluid may be jetted simultaneously with the binder fluid using, for example, a two-channel printhead supplied with both the binder fluid and the inhibitor fluid. The inhibitor fluid functions to inhibit polymerization of the monomer beyond those predetermined regions intended for binding the building material 6. For example, the inhibitor fluid may be jetted onto perimeter boundary regions surrounding the predetermined regions receiving the binder fluid. Examples of suitable inhibitor fluids for inhibiting cationic and/or free radical polymerization will be well known to the person skilled the art. For example, inhibitor fluids may include, for example, amines (including aliphatic, aromatic and heterocyclic amines), amides, urethanes, carbamates, guanidines, 4-methoxyphenol (MEHQ), butylated hydroxytoluene (BHT), 4-tertbutyl catechol (TBC), hydroxyquinone (HQ), 4-hydroxy TEMPO etc.

Figure 1D:
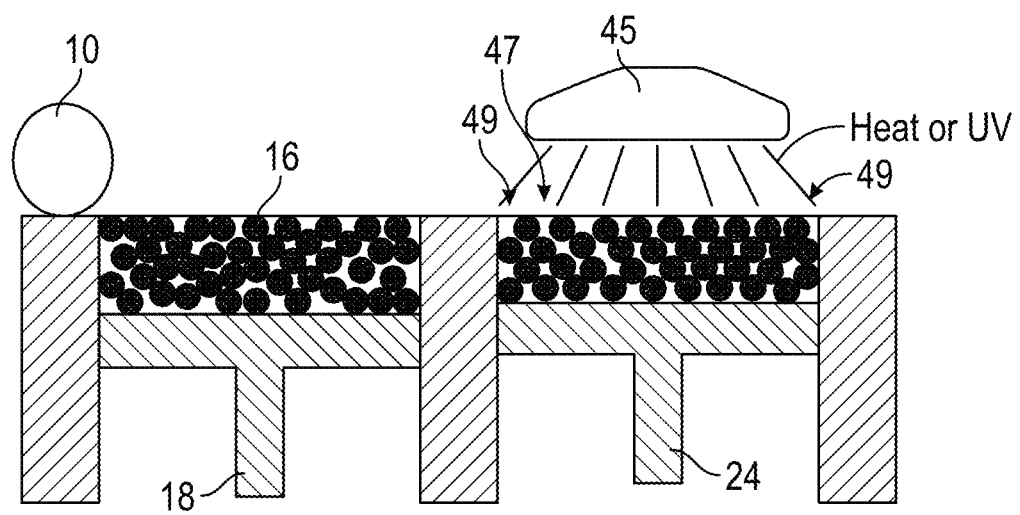
FIG. 1D is a schematic side view of a UV or thermal polymerization initiation step.

Following selective deposition of the binder fluid (and optionally the inhibitor fluid, as described in connection with FIG. 1C), the green part is typically exposed to an energy source (e.g. UV or heat) as shown in FIG. 1D in order to initiate polymerization of the monomer and/or cure partially-polymerized material. The steps shown in FIGS. 1A-D are then sequentially repeated to build up successive layers of the green part until it is completed.

Once the green part is fully formed, it may be subjected to a final curing step before excess unbound build material 49 is removed from the fabrication bed. The unbound build material may be recycled for use in building subsequent green parts, as known in the art.

Having been completely formed, the green part 47 is then removed from the fabrication bed 4 and placed in a furnace for sintering. Sintering fuses together the bound particles (e.g. metallic particles) of the green part 47 and removes the binding polymer, thereby providing the finished 3D object.

Inkjet Vehicle

The binder fluid generally comprises a catalyst dispersed or dissolved in an inkjet vehicle ("binder vehicle"). Likewise, the inhibitor fluid generally comprises a polymerization inhibitor dispersed or dissolved in an inkjet vehicle ("inhibitor vehicle"). Binder vehicles and inhibitor vehicles used in the present invention are typically conventional aqueous inkjet vehicles comprising at least 40 wt % water, at least 50 wt % water or at least 60 wt % water. Usually, the amount of water present in the binder vehicle is in the range of 40 wt % to 90 wt %, or optionally in the range of 50 wt % to 70 wt %.

Inkjet vehicles used in the present invention may further comprise co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include $C_{1-4}$ alkyl alcohols, such as ethanol, methanol, butanol, propanol, and 2-propanol; alkylene glycols, such as ethylene glycol, diethylene glycol, triethylene glycol and tetraethylene glycol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, ε-caprolactam, dimethyl sulfoxide, morpholine, N-ethylmorpholine, 1,3-dimethyl-2-imidazolidinone and combinations thereof.

The inkjet vehicle may contain another high-boiling water-soluble organic solvent as a co-solvent, which can serve as a wetting agent or humectant for imparting water retentivity and wetting properties to the fluid. Examples of high-boiling water-soluble organic solvents are 2-butene-1, 4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, trimethylolpropane, erythritol, pentaerythritol and combinations thereof.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet vehicle may also contain a penetrant, as one of the co-solvents. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

Typically, the total amount of co-solvent present in the inkjet vehicle is in the range of about 5 wt % to 60 wt %, or optionally 10 wt % to 50 wt %.

The inkjet vehicle may also contain one or more other surface active agents ("surfactant"), such as an anionic surface active agent, a zwitterionic surface active agent, a nonionic surface active agent or mixtures thereof. Useful anionic surface active agents include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are di($C_{6-30}$ alkyl) sulfosuccinate sodium salt, sodium dodecylbenzenesulfonate, sodium laurate, and a polyoxyethylene alkyl ether sulfate ammonium salt.

Examples of zwitterionic surface active agents include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N-(Z-9-octadecenyl)-N-amine oxide.

Examples of nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate.

Acetylene glycol surface active agents, such as 2,4,7,9-tetramethyl-5-decyne-4,7-diol; ethoxylated 2,4,7,9-tetramethyl-5-decyne-4,7-diol; 3,6-dimethyl-4-octyne-3,6-diol or 3,5-dimethyl-1-hexyn-3-ol, may also be used. Specific examples of nonionic surfactants, which may be used in the present invention, are Surfynol® 465 and Surfynol® 440 (available from Air Products and Chemicals, Inc).

Rake-type alkoxylated silicone surfactants may also be used in the inkjet vehicle. Specific examples of rake-type ethoxylated silicone surfactants are BYK-345, BYK-346 and BYK-349 (manufactured by BYK Japan K.K.), as well as Silface™ SAG-002, SAG-005, SAG-008, SAG-KB and SAG-503A (manufactured by Nissin Chemical Industry Co. Ltd.).

The surfactant(s) are typically present in the inkjet vehicle in an amount ranging from 0.05 wt. % to 2 wt % or 0.1 to 1 wt. %.

The inkjet vehicle may also include a pH adjuster or buffer, such as sodium hydroxide, potassium hydroxide, lithium hydroxide, sodium carbonate, sodium hydrogencarbonate, potassium carbonate, potassium hydrogencarbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl)aminomethane hydrochloride, triethanolamine, diethanolamine, diethylethanolamine, triisopropanolamine, butyldiethanolamine, morpholine, propanolamine, 4-morpholineethanesulfonic acid and 4-morpholinepropanesulfonic acid ("MOPS"). The amount of pH adjuster, when present, is typically in the range of from 0.01 to 2 wt. % or 0.05 to 1 wt. %.

The inkjet vehicle may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The amount of biocide, when present, is typically in the range of from 0.01 to 2 wt. % or 0.05 to 1 wt. %.

The inkjet vehicle may also contain a sequestering agent, such as ethylenediaminetetraacetic acid (EDTA).

Inkjet Printheads

The binder fluids and inhibitor fluids used in the present invention are primarily for use in connection with thermal inkjet printheads, although they may of course be used in other types of printhead. Suitable types of inkjet printhead are described in, for example, U.S. Pat. Nos. 7,347,537, 8,998,383, 7,669,996, 10,293,609, 9,950,527, 9,283,756 and 9,994,017, the contents of each of which are incorporated herein by reference.

Monomers and Binder Fluids

Table 1 below shows a number of useful monomer and catalyst combinations that may be used in the present invention. It will, of course, be appreciated that such combinations are non-limiting and the skilled person will be readily aware of other suitable combinations based on well-known polymer chemistry.

TABLE 1

Monomer and Catalyst Types

| Monomer | Catalyst (Binder Fluid) |
|---|---|
| Epoxide (e.g. glycidyl ethers, aliphatic epoxides) | Diaryliodonium salt, triarylsulfonium salt, polyamine, polythiol |
| Lactone (e.g. cyclic carbonates) | Diaryliodonium salt, triarylsulfonium salt |
| Paraformaldehyde | Diaryliodonium salt, triarylsulfonium salt |
| Vinyl ether | Diaryliodonium salt, triarylsulfonium salt |
| Oxetane | Diaryliodonium salt, triarylsulfonium salt |
| Acrylate | 4-4'-azo-bis-4-cyanopentanoic acid, 2,2'-azobis(2-methylpropionamidine) dihydrochloride, di-alkyl peroxide, persulfate, diamine |
| Alkene, cycloalkene | Grubbs catalyst (organoruthenium) |
| Silane, alkene | Platinic acid |

From the foregoing, it will be appreciated that aqueous-based binder fluids are generally preferred from the point of view of compatibility with thermal inkjet printheads. However, alcohol-based inkjet vehicles, such as those described in U.S. Pat. No. 8,101,012 (the contents of which are incorporated herein by reference) may be useful for certain catalysts, such as Grubbs catalysts (organoruthenium catalysts) used for alkene metathesis.

Polymerization Types

The field of polymerization chemistry will be well known to the person skilled in the art. Indeed, polymerization chemistry is well-established in industrial applications and follows predictable reaction pathways using known monomers, catalysts and initiation/curing conditions.

Monomers described above, such as epoxide monomers or acrylate monomers, may be polymerized using cationic polymerization processes or free radical polymerization processes, respectively. Cationic and free radical polymerization may be initiated using either thermal initiation (e.g. conventional heat or IR irradiation) or photoinitiation (e.g. UV irradiation).

For a typical metallic powder coated with a suitable monomer, Table 2 shows a number of exemplary polymerization and catalyst types, as well as polymerization inhibitors.

TABLE 2

Polymerization and Catalyst Types

| Process | Polymerization & Catalyst Types | |
|---|---|---|
| | Cationic Polymerization | Free Radical Polymerization |
| UV | Diaryliodonium Triarylsulfonium Ferrocenium N-Hydroxynaphthalimide | Benzoin ethers Benzil ketals α-Dialkoxy-acetophenones α-Hydroxyalkylphenones |

TABLE 2-continued

Polymerization and Catalyst Types

| Process | Polymerization & Catalyst Types | |
|---|---|---|
| | Cationic Polymerization | Free Radical Polymerization |
| | N-Hydroxy-5-norbornene-2,3-dicarboximide | α-Aminoalkylphenones Acylphosphine oxides Benzophenones/amines Thioxanthones/amines Titanocenes Anthroquinones & quinones |
| Thermal | Diaryliodonium Diaryliodonium/copper salts Ammonium Pyridinium Triarylsulfonium Boron halide/amine Benzylpyrazinium Benzylquinoxalinium | Bis-azo Organic peroxide Inorganic peroxide Alkoxyamino |
| Inhibitor | Bronsted bases: Amines Heterocyclics Amides Urethanes Ureas Carbamates Guanidines | Phenols: BHT 4-t-butylcatechol MEHQ Hydroxyamine: Diethylhydroxyamine (DEHA) 4-hydroxy TEMPO |

Exemplary monomer coatings, binder fluid and inhibitor fluids formulations are described in examples below. All amounts expressed as a percentage are taken to be wt. % of a given formulation.

Monomer-Coated Powders

Free Radical Polymerization (Examples 1-3)

EXAMPLE 1

| | |
|---|---|
| Ethyl acrylate | 1.0 g |
| 1,6-hexanedioldiacrylate | 0.5 g |
| MEHQ | 200 ppm |
| Diethyl ether | 250 ml |
| Powder | 100 g |

EXAMPLE 2

| | |
|---|---|
| Bisphenol A-glycolerate diacrylate | 1.5 g |
| Triethyleneglycol divinyl ether | 0.5 g |
| MEHQ | 200 ppm |
| Dichloromethane | 100 ml |
| Powder | 100 g |

EXAMPLE 3

| | |
|---|---|
| Ethyl acrylate | 1.0 g |
| 1,6-hexanedioldiacrylate | 0.5 g |
| MEHQ | 200 ppm |
| Diethyl ether | 250 ml |
| Powder | 100 g |

Cationic Polymerization (Examples 4-6)

EXAMPLE 4

| | |
|---|---|
| Bisphenol A diglycidyl ether | 0.5 g |
| Polyethylene glycol diglycidyl ether (Mw = 500) | 0.5 g |
| THF | 150 ml |
| Powder | 100 g |

EXAMPLE 5

| | |
|---|---|
| 1,4-butanediol diglycidyl ether | 0.5 g |
| (3,4-epoxycyclohexane) methyl-3,4-epoxycyclohexane carboxylate) ECC | 1.0 g |
| Diethyl ether | 150 ml |
| Powder | 100 g |

EXAMPLE 6

| | |
|---|---|
| ECC | 0.5 g |
| Resorcinol diglycidyl ether | 0.5 g |
| THF | 150 ml |
| Powder | 100 g |

Aqueous Binder Fluids
Free Radical Polymerization—Thermal Initiation (Examples 7-10)

EXAMPLE 7

| | |
|---|---|
| Ethylene glycol | 13..3% |
| Methanol | 11.5% |
| 3-Sulfolene | 5.0% |
| Diethylene glycol butyl ether | 2.7% |
| Surfynol ® 104 | 1.0% |
| 4-4'-azobiscyanopentanoic acid | 2.5% |
| Water | balance |

EXAMPLE 8

| | |
|---|---|
| Triethylene glycol | 10% |
| Glycerol | 7% |
| Surfynol ® 465 | 1.0% |
| 4-4'-azobiscyanopentanoic acid | 2.% |
| Water | balance |

EXAMPLE 9

| | |
|---|---|
| Triethylene glycol | 10% |
| Glycerol | 7% |
| Surfynol ® 465 | 1.0% |
| Ammonium persulfate | 2.% |
| Water | balance |

EXAMPLE 10

| | |
|---|---|
| Ethylene glycol | 5.0% |
| Isopropyl alcohol | 18.0% |
| Diethylene glycol monobutyl ether | 10.0% |
| Luperox ® DI (tert-Butyl peroxide) | 2.5% |
| Surfynol ® 485 | 1.5% |
| Water | balance |

Free Radical Polymerization—Photoinitiated (Examples 11-13)

EXAMPLE 11

| | |
|---|---|
| Ethylene glycol | 7.0% |
| PEG 400 | 2.0% |
| Zonyl ® FS-610 | 1.0% |
| Anthroquinone 2-sulfonic acid sodium salt | 2.0% |
| Water | balance |

EXAMPLE 12

| | |
|---|---|
| Triethylene glycol | 10.0% |
| Diethylene glycol monobutyl ether | 12.0% |
| Glycerol | 1.0% |
| Surfynol ® 485 | 1.5% |
| Diphenyliodonium hexafluorophosphate | 2.0.% |
| Water | balance |

EXAMPLE 13

| | |
|---|---|
| Ethylene glycol | 10.0% |
| Diethylene glycol monobutyl ether | 3.0% |
| Glycerol | 1.0% |
| Surfynol ® 485 | 1.5% |
| Ferrocenium hexafluorophosphate | 2.0% |
| Water | balance |

Cationic Polymerization—Thermal Initiation (Examples 14-15)

EXAMPLE 14

| | |
|---|---|
| Ethylene glycol | 10.0% |
| Glycerol | 4.0% |
| IGEPAL ® CA-630 | 1.0% |
| Diphenyliodonium nitrate | 2.5.% |
| Copper II benzoate | 1.25.% |
| Water | balance |

EXAMPLE 15

| | |
|---|---|
| Triethylene glycol | 10.0% |
| Glycerol | 4.0% |

-continued

| | |
|---|---|
| Surfynol® 104 | 1.0% |
| Diphenyliodonium hexafluorophosphate | 2.5.% |
| Water | balance |

Cationic Polymerization—Photoinitiation (Examples 16-17)

EXAMPLE 16

| | |
|---|---|
| Triethylene glycol | 10.0% |
| Diethylene glycol butyl ether | 12.0% |
| 1-Butanol | 1.5.0% |
| DYNOL™ 360 | 1.5% |
| Diphenyliodonium nitrate | 2.0.% |
| N-Phenylglycine | 2.0% |
| Water | balance |

EXAMPLE 17

| | |
|---|---|
| Ethylene glycol | 13.0% |
| Iso-propyl alcohol | 3.0% |
| Glycerol | 4.5% |
| Surfynol® 485 | 1.5% |
| Diphenyliodonium hexafluorophosphate | 2.0.% |
| Water | balance |

Solvent-Based Binder Fluids
Free Radical Polymerization—Thermal Initiation

EXAMPLE 18

| | |
|---|---|
| n-Methylpyrrolidone (NMP) | 20% |
| Diglyme | 10% |
| Zonyl® FSO | 0.8% |
| Luperox® 101 (2,5-Bis(tert-butylperoxy)-2,5-dimethylhexane) | 2.5% |
| Ethanol | balance |

Free Radical Polymerization—Photoinitiation

EXAMPLE 19

| | |
|---|---|
| 2-Methoxyethyl acetate | 23.0% |
| 1-Propanol | 17.0% |
| Zonyl® FSN | 0.2% |
| Phenylbis(2,4,6-trimethylbenzoyl) phosphine oxide | 4.0% |
| Ethanol | balance |

Cationic Polymerization—Thermal Initiation

EXAMPLE 20

| | |
|---|---|
| 2-Butoxyethanol | 20.0% |
| 1-Propanol | 17.0% |

-continued

| | |
|---|---|
| Zonyl® FSN | 0.2% |
| Bis-(4-methylphenyl) iodonium hexafluorophosphate | 4.0% |
| Copper II benzoate | 2.0% |
| Ethanol | balance |

Cationic Polymerization—Photoinitiation

EXAMPLE 21

| | |
|---|---|
| Diglyme | 10.0% |
| Diethylene glycol butyl ether | 12.0% |
| N-Phenylglycine | 1.5% |
| N-vinylcarbazole | 1.5% |
| Bis-(4-tert-butylphenyl) iodonium hexafluorophosphate | 3.0.% |
| Zonyl® FSO | 0.2% |
| 2-Propanol | balance |

Aqueous Inhibitor Fluids
Free Radical Polymerization (Example 22-23)

EXAMPLE 22

| | |
|---|---|
| Ethylene glycol | 15.0% |
| Ethanol | 20.0% |
| N,N-Diethylhydroxylamine | 4.0% |
| Glycerol | 3.0% |
| DYNOL™ 360 | 0.6% |
| Water | Balance |

EXAMPLE 23

| | |
|---|---|
| Ethylene glycol | 15.0% |
| Glycerol | 5.0% |
| 4-Hydroxy-TEMPO | 2.5% |
| Surfynol® 465 | 1.0 |
| Water | Balance |

Cationic Polymerization (Example 24-25)

EXAMPLE 24

| | |
|---|---|
| Ethylene glycol | 15.0% |
| Glycerol | 5.0% |
| Urea | 4.0% |
| Surfynol® 104 | 0.8% |
| Water | Balance |

EXAMPLE 25

| | |
|---|---|
| Ethylene glycol | 15.0% |
| Glycerol | 5.0% |
| Tetramethylethylenediamine | 3.0% |
| Surfynol® 104 | 1.0% |
| Water | Balance |

Binder fluids absent any kogative ingredients, such as the binder fluids exemplified above, are well suited to thermal inkjet printing. For example, diaryliodonium salts and triarylsulfonium salts are excellent polymerization catalysts suitable for formulation in aqueous inkjet binder fluids.

It will, of course, be appreciated that the present invention has been described by way of example only and that modifications of detail may be made within the scope of the invention, which is defined in the accompanying claims.

The invention claimed is:

1. An additive manufacturing method using an inkjet printhead supplied with a binder fluid, said method comprising the steps of:
    (a) providing a layer of powdered build material including a monomer;
    (b) selectively jetting the binder fluid onto one or more first predetermined regions of the layer of powdered build material, said binder fluid comprising a catalyst;
    (c) selectively depositing an inhibitor fluid onto one or more second predetermined regions of the layer of powdered build material, the inhibitor fluid comprising a polymerization inhibitor;
    (d) optionally exposing the layer of powdered build material to an energy source to initiate polymerization of the monomer; and
    (e) optionally repeating steps (a) to (d).

2. The method of claim 1, wherein the inkjet printhead is a pagewide thermal inkjet printhead.

3. The method of claim 1, wherein the binder fluid is absent any polymers having a molecular weight of 5,000 g/mol or more.

4. The method of claim 1, wherein the binder fluid is absent any acrylic polymers or acrylic copolymers.

5. The method of claim 1, wherein the binder fluid is absent any polymers.

6. The method of claim 1, wherein the catalyst is soluble in the binder fluid.

7. The method of claim 1, wherein the catalyst is present in the binder fluid in an amount of 5 wt. % or less.

8. The method of claim 1, which includes the step of non-selectively depositing a primer fluid comprising the monomer onto the layer of powdered build material.

9. The method of claim 1, wherein the build material is pre-treated with the monomer.

10. The method of claim 1, wherein the build material is a metallic powder.

11. The method of claim 1, wherein the second predetermined regions are different than the first predetermined regions.

12. The method of claim 1, wherein the inhibitor fluid is jetted from a same inkjet printhead as the binder fluid.

13. The method of claim 1, further comprising at least one of:
    a curing step;
    a step of removing the build material from regions outside the first predetermined regions; and
    a sintering step.

14. The method of claim 1, wherein the catalyst has a molecular weight of 1000 g/mol or less.

15. The method of claim 1, wherein the binder fluid is aqueous-based and the catalyst is selected from the group consisting of: diaryliodonium salts, triarylthionium salts, azobis(cyanoalkanoic acid) and 2,2'-azobis(2-methylpropionamidine) dihydrochloride.

16. The method of claim 1, wherein the monomer is selected from the group consisting of: epoxides, glycidyl ethers, lactones, paraformaldehyde, vinyl ethers, oxetanes and acrylates.

17. The method of claim 1, wherein the polymerization inhibitor is selected from Bronsted bases, phenols and hydroxyamines.

* * * * *